United States Patent [19] [11] 3,723,595
Spedden [45] Mar. 27, 1973

[54] PROCESS FOR RECOVERING VOLATILIZED RHENIUM OXIDES AND SULFUR OXIDES FROM GAS STREAMS

[75] Inventor: Henry Rush Spedden, Salt Lake City, Utah

[73] Assignee: Kennecott Copper Corporation, New York, N.Y.

[22] Filed: July 12, 1971

[21] Appl. No.: 161,498

[52] U.S. Cl. .................... 423/50, 423/49, 423/210, 423/242
[51] Int. Cl. ............................................. C01g 47/00
[58] Field of Search..23/18, 22, 25 Q, 15 W; 423/49, 423/50, 210, 242

[56] References Cited

UNITED STATES PATENTS

| | | | |
|---|---|---|---|
| 3,475,122 | 10/1969 | McRae et al. | 23/2 SQ |
| 2,809,092 | 10/1957 | Zimmerl et al. | 23/15 W |
| 2,967,757 | 1/1961 | Zimmerley et al. | 23/15 W |

Primary Examiner—Herbert T. Carter
Attorney—Philip A. Mallinckrodt et al.

[57] ABSTRACT

A gas stream containing a silfur oxide and a volatilized rhenium oxide is scrubbed with an aqueous alkaline solution containing ions capable of forming sulfites and bisulfites, e.g., an ammonium or an alkali metal solution, to remove practically all of the sulfur oxide from the gas stream as a soluble sulfite and to dissolve the rhenium oxide in the resulting sulfite solution, which is maintained alkaline for the purpose. The rhenium-bearing sulfite solution is treated by known means, such as ion exchange or solvent extraction, to recover the rhenium oxide contained therein, and the effluent sulfite solution is then employed as the scrubbing solution in a second gas scrubbing stage in which a different sulfur-oxide-containing gas stream, such as the exit gas from a sulfuric acid plant, having substantially no rhenium content, is scrubbed to extract sulfur oxide, making such effluent sulfite solution acid and converting the sulfites into soluble bisulfites. Sulfur values are preferably recovered from the resulting bisulfite solution.

13 Claims, 1 Drawing Figure

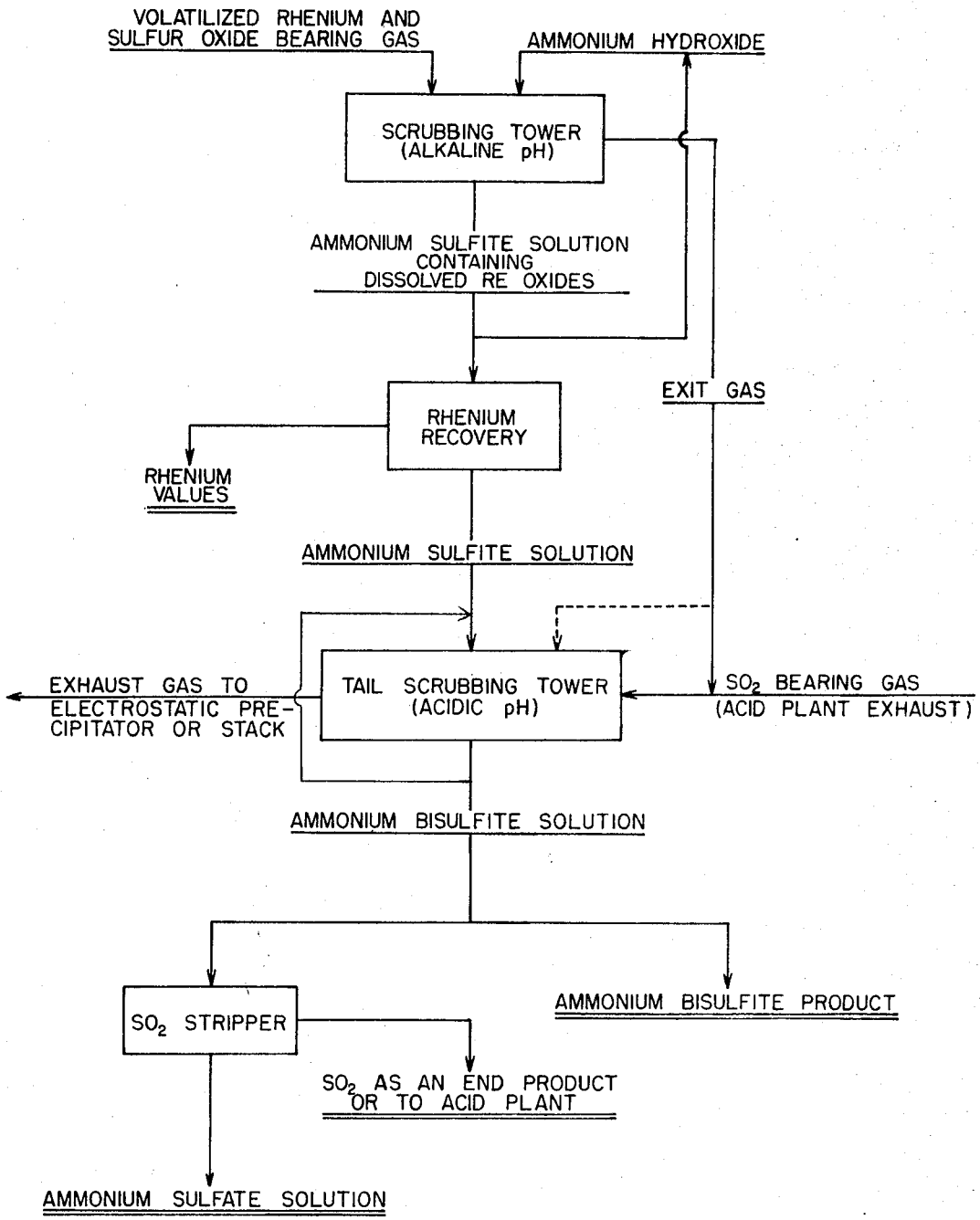

PROCESS FOR RECOVERING VOLATILIZED RHENIUM OXIDES AND SULFUR OXIDES FROM GAS STREAMS

BACKGROUND OF THE INVENTION

1. Field

This invention relates to the extraction of rhenium values from gas steams containing same.

2. State of the Art

It has long been standard practice to extract volatilized rhenium oxides from effluent gases of molybdenite roasters by scrubbing the gases in conventional scrubbers with water that is recycled to build up the rhenium content. The water also dissolves sulfur oxides, and in the course of the operation becomes saturated with sulfur dioxide and strongly acid in character. Following such saturation, continuation of the process results in additional extraction of rhenium values from the gas stream but no additional extraction of sulfur dioxide. Consequently, if the exhaust gas is vented directly to the atmosphere it constitutes a pollutant. Otherwise, further expensive procedures are required for elimination of the sulfur dioxide.

A known process for extracting $SO_2$ from smelter stack gases employs two scrubbers through which the sulfur dioxide-bearing gases flow countercurrent to a scrubbing solution containing ammonium sulfite, which extracts the sulfur dioxide and is converted into ammonium bisulfite (acid pH) in the scrubber through which the gases first flow and the solution flows secondly. The other scrubber is operated at a basic pH to remove residual amounts of sulfur dioxide contained in the exit gas from the first scrubber. The process has not been employed to extract rhenium values from effluent gas streams containing both rhenium oxides and sulfur oxides. If the process were to be used for that purpose, additional amounts of expensive ammonium hydroxide reagents would be required to neutralize the acidic pH in the first scrubber in order to obtain satisfactory recovery of the rhenium values from the solution.

3. Objectives

In the making of the present invention, it was an objective to extract rhenium oxides from an effluent industrial gas containing same, as well as to recover, as a useful bisulfite product, the sulfur oxides contained in such gas stream, thereby eliminating a source of atmospheric pollution as well as obtaining significant economic returns.

SUMMARY OF THE INVENTION

In accordance with the invention, a gas stream, containing a rhenium oxide and a sulfur oxide, is intimately contacted with an aqueous alkaline solution containing cations capable of forming sulfites and bisulfites. Suitable gas streams containing both rhenium and sulfur oxides include the exhaust gases from copper reverberatory furnaces and molybdenite roasters. Conventional gas scrubbing apparatus, such as Venturi-type scrubbers, are well suited to utilization in the process. Typical cations capable of forming the required sulfites and bisulfites are ammonium ions and alkali metal ions. In the first scrubbing step, the scrubbing solution extracts the major part, if not all, of the sulfur oxide or oxides, e.g. sulfur dioxide and trioxide from the gas stream to form a soluble sulfite. The volatilized rhenium oxide or oxides are dissolved in the alkaline solution and are thereby extracted from the gases.

The effluent solution from the first scrubbing step containing the dissolved sulfites and rhenium oxides, is treated to remove the rhenium oxides from the solution. Known extraction techniques, such as ion exchange or solvent extraction, can be employed for this purpose.

The stripped solution containing the dissolved sulfite or sulfites is employed as the scrubbing solution in the other scrubbing stage, in which a second gas stream containing a sulfur oxide is scrubbed at an acid pH to remove the sulfur oxide or oxides from the gas stream and to provide the additional moles of sulfite necessary to convert the sulfites to bisulfites. It may be desirable to also run the exhaust gas from the first scrubber into the second scrubber to salvage the alkaline reagent contained in mist carried by such exhaust gas and to recover any residual sulfur oxides that may have escaped the first scrubber. The resulting bisulfite solution can be treated by known means to recover a bisulfite product, e.g. ammonium bisulfite, or, if desired, can be treated to strip out sulfur dioxide for direct recovery of $SO_2$ or for the production of sulfuric acid, leaving a sulfate product, e.g. ammonium sulfate, in the solution. The exhaust gas from the other scrubbing stage can either be cycled through a wet electrostatic precipitator to reduce the mist content or can be vented directly to the atmosphere.

THE DRAWING

The best mode presently contemplated of carrying out the invention is illustrated in the accompanying drawing, in which the single FIGURE is a flowsheet showing the process applied to a gas stream containing volatilized rhenium oxides and sulfur oxides.

DETAILED DESCRIPTION OF THE ILLUSTRATED PROCEDURES

As illustrated in the accompanying flowsheet, any gas stream containing both volatilized rhenium oxides and sulfur oxides, such as sulfur dioxide or sulfur trioxide, can be employed as the input gas in the first step of the process. Most commercial sources of volatilized rhenium oxides, including molybdenite roasting operations and copper reverberatory furnaces, generate significant quantities of sulfur oxides in addition to the volatilized rhenium oxides.

In the first step of the process, the gas stream containing the volatilized rhenium oxides and sulfur oxides is intimately contacted at an alkaline pH with an aqueous solution containing cations capable of forming a soluble sulfite, in this instance ammonium ions, in a conventional scrubber, such as a Venturi scrubber. Ammonia is preferably introduced into the aqueous solution prior to the solution contacting the gas stream, so that ammonium hydroxide is generated in the solution to create an alkaline medium. Alternatively, ammonium hydroxide is conveniently generated in situ within the scrubber by injecting ammonia gas which contacts the aqueous solution forming ammonium hydroxide. Sufficient ammonium hydroxide is present in the solution to maintain the pH on the alkaline side, preferably between about pH 8 and pH 10. As the ammonium ions react with the sulfur oxides in the gas stream, the formation of ammonium sulfute causes a reduction in the ammonium hydroxide concentration, requiring the introduction of additional amounts of ammonia into the reaction. Although ammonium ions are employed in the detailed embodiment of the process, other cations capable of generating hydroxides to control pH and to form sulfites and bisulfites in alkaline and acidic solutions, respectively, can be employed. Notable examples are the alkali metals, e.g., sodium, potassium, etc.

Temperatures in the scrubber are not critical; however, if the input gases are not quenched or otherwise reduced in temperature to about 50°C or below, the losses of ammonia due to volatilization begin to rise and the scrubbing efficiency for rhenium extraction from the gases is reduced.

The effluent solution from the first scrubbing step is preferably recycled to the first scrubber to increase the concentration of dissolved sulfites and rhenium oxides before the solution is bled off from the scrubber and treated for recovery of the rhenium oxides. The increased concentration of rhenium oxides in the solution permit greater efficiency of operation in recovering the rhenium oxides from the effluent solution.

The effluent solution from the first scrubbing step can be treated in any conventional manner to recover the dissolved rhenium oxides contained therein. For example, the solution lends itself to treatment with ion exchange resins or conventional solvent extraction techniques.

The exit gas from the first scrubbing step, which may contain ammonia and amounts of sulfur oxides which were not removed in the first scrubber, is introduced into a second scrubber in which the residual raffinate solution from the rhenium oxide recovery treatment is employed as the scrubbing solution. The residual solution still contains the dissolved ammonium sulfite. In addition to the exit gas from the first scrubber, a second gas stream containing sulfur oxides is also introduced into the second scrubber. A typical sulfur oxide-bearing gas stream in the exit gas from a sulfuric acid plant. Other gas streams containing sulfur dioxide and/or sulfur trioxide can be employed. In the second scrubbing step, the sulfur oxides from the combined exit gas and second gas stream are extracted from the gas streams by the scrubbing solution which is maintained at an acid pH, preferably about pH 4.5 to about pH 6.5. In an acid medium, the ammonium sulfite is converted to the bisulfite and any residual amounts of ammonia contained in the exit gas from the first scrubber are removed therefrom for virtually complete efficiency in the utilization of ammonium ions.

The exit gas from the second scrubber can be routed through a wet electrostatic precipitator to remove any additional amounts of mist or vapor from the gases; or the gas can be vented directly to the atmosphere if desired.

The bisulfite-containing effluent solution from the second scrubber can be treated by conventional means to recover the solid bisulfite product or can be treated for the removal of $SO_2$ to produce solid ammonium sulfate useful as a fertilizer.

Whereas this invention is illustrated and described herein with respect to certain preferred procedures thereof, it is to be understood that many variations are possible without departing from the inventive concepts particularly pointed out in the claims.

I claim:

1. A process for recovering rhenium and sulfur values from effluent gases containing such values in the form of oxides, comprising
   intimately contacting a stream of such a gas with an aqueous alkaline solution containing an appropriate cation in amount effective to combine with sulfur values and to form a soluble sulfite solution;
   continuing said contacting while maintaining said sulfite solution alkaline, thereby extracting a maximum quantity of rhenium values from the gas stream;
   treating the resulting rhenium-bearing sulfite solution for the recovery of its contained rhenium values to produce a sulfite solution substantially free of rhenium; and
   intimately contacting a second, substantially rhenium-free stream of gas, that contains a sulfur oxide, with the effluent sulfite solution from the rhenium-recovery step, so as to remove sulfur oxide from said second stream of gas and convert the sulfite in said solution to a bisulfite.

2. A process as set forth in claim 1, wherein sulfur values are recovered from the bisulfite solution resulting from the second gas contacting step.

3. A process as set forth in claim 2, wherein the aqueous alkaline solution is ammonium hydroxide; and wherein the sulfur values recovered from the bisulfite solution comprises ammonium bisulfite.

4. A process as set forth in claim 2, wherein the aqueous alkaline solution is ammonium hydroxide; and wherein the sulfur values recovered from the bisulfite solution comprises sulfur dioxide and ammonium sulfate.

5. A process as set forth in claim 2, wherein the solutions are recycled back to and through the respective gas contacting steps before recovering the respective values therefrom.

6. A process as set forth in claim 1, wherein the cation is selected from the group consisting of ammonium and alkali metals.

7. A process as set forth in claim 1, wherein the contacting steps are carried out by gas scrubbing procedures.

8. A process as set forth in claim 1, wherein the first gas stream is the effluent gas from a reverberatory furnace in which copper sulfide ore concentrates are being smelted.

9. A process as set forth in claim 8, wherein the second gas stream is the exit gas from a sulfuric acid plant.

10. A process as set forth in claim 1, wherein the pH of the solution in the first contacting step lies within the range of about pH 8 and pH 10.

11. A process as set forth in claim 7, wherein the pH of the solution in the second contacting step lies within the range of about pH 4.5 to about pH 6.5.

12. A process as set forth in claim 1, wherein the cation is introduced into the aqueous solution prior to contacting the first gas stream with said solution.

13. A process as set forth in claim 1, wherein the first contacting step is carried out by gas scrubbing procedures, and the cation is ammonium and is introduced into the solution by introducing ammonia gas into the scrubbing zone.

* * * * *